US007818733B2

(12) United States Patent
Hargrave et al.

(10) Patent No.: US 7,818,733 B2
(45) Date of Patent: Oct. 19, 2010

(54) IMPROVING BUNDLE CONTROL IN COMPUTING ENVIRONMENT

(75) Inventors: Bentley J. Hargrave, DeLand, FL (US); James P. Robbins, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1237 days.

(21) Appl. No.: 11/236,448

(22) Filed: Sep. 27, 2005

(65) Prior Publication Data
US 2007/0083925 A1 Apr. 12, 2007

(51) Int. Cl.
*G06F 9/44* (2006.01)
*G06F 9/46* (2006.01)

(52) U.S. Cl. ............. 717/166; 717/120; 717/175; 718/102; 719/332

(58) Field of Classification Search .......... None
See application file for complete search history.

(56) References Cited

U.S. PATENT DOCUMENTS 6,272,674 B1 * 8/2001 Holiday, Jr. ............ 717/174
6,792,596 B2 * 9/2004 Maruyama et al. ......... 717/110
2004/0194059 A1 * 9/2004 Akella et al. ............ 717/118
2006/0233126 A1 * 10/2006 Herenyi et al. ........... 370/328

* cited by examiner

*Primary Examiner*—Michael J Yigdall
(74) *Attorney, Agent, or Firm*—Justin M. Dillon; Gregory K Goshorn; Greg Goshorn, P.C.

(57) ABSTRACT

Provided is a method for managing sets of OSGi bundles in a manner that enables a developer to control the order in which bundles are activated, both within and among OSGi start levels. Also provided is a method for eliminating multiple instances of the OSGi class loaders that are typically generated for each bundle. A bundle consolidator tool is provided that combines multiple bundles in a set of bundles into a master bundle that appears to the OSGi framework to be a single bundle. An activator method enables the developer to specify the order in which individual bundles are initiated and terminated. In addition, a single class loader thread is employed to activate the individual bundles. The bundle consolidator tool also analyzes the target bundles for name space collisions and, in the event a collision is detected, the tool is programmed to modify byte codes to eliminate the collision.

18 Claims, 5 Drawing Sheets

US 7,818,733 B2

IMPROVING BUNDLE CONTROL IN COMPUTING ENVIRONMENT

TECHNICAL FIELD

The present invention relates generally to computing systems and, more specifically, to a method for providing greater control over bundle activation in an OSGi environment.

BACKGROUND OF THE INVENTION

In 1999, the OSGi® Alliance, herein after referred to simply as "OSGi," was initiated to develop an open specification for the delivery of services over local networks and devices. Currently, the OSGi standard is supported by over eighty (80) companies. OSGi was developed to provide services to environments such as homes, cars and offices. Some embedded devices that employ the OSGi specification include, but are not limited to, television set top boxes, service gateways, cable modems, consumer electronic devices, personal computers (PCs), industrial computers and automobiles. A specification, entitled "The OSGi Services Platform, Release 2," was published in October 2001.

The OSGi environment is organized around a "framework" and "bundles." The OSGi framework provides an execution environment for electronically downloadable services, or bundles. The framework includes a Java runtime engine, life cycle management, data storage, version management and a service registry. Bundles are the primary software components in the OSGi environment. They can contain Java classes and other resources, which provide libraries, services, and applications to end-users of a computing system and to other bundles. Typically, bundles are stored in a standard Zip-based Java file format, or Java Archive (JAR) file.

Currently, applications or services are often packaged as a set of bundles that interact with each other and are interdependent. Each bundle must have its own activator and deactivator methods, which are called by the framework whenever the bundle is started or stopped, respectively. The OSGi framework calls bundle activators corresponding to each bundle in a set in a serial fashion when the framework or the bundles are started. The order in which bundles are started and the activators called can be roughly controlled by means of OSGi start levels but, within individual start levels, bundles are activated in an arbitrary order. In addition, the OSGI framework creates a class loader for each bundle started.

What is needed is a method that enables a developer to control the order in which bundles are activated, both within and among start levels, so that interdependencies can be more efficiently managed. Also needed is a method for eliminating multiple instances of class loaders that are, under current practices, generated for each individual bundle. Also needed is a tool for analyzing bundles for dependencies and name space collisions and, if necessary, to modify bundles to eliminate detected name space collisions.

SUMMARY OF THE INVENTION

Provided is a method for managing sets of OSGi bundles in a manner that enables a developer to control the order in which bundles are activated, both within and among OSGi start levels. In this manner, interdependencies among bundles can be more efficiently managed. In current systems, the order in which bundles are activated can only be controlled in a limited fashion by assigning bundles to various start levels. A developer does not have control over the activation order within any particular start level.

Also provided is a method for eliminating multiple instances of the OSGi class loaders that are, under current techniques, generated for each individual bundle. The disclosed subject matter employs a single class loader to load multiple classes.

A bundle consolidator tool is provided that combines multiple bundles in a set of bundles into a master bundle that appears to the OSGi framework to be a single bundle. An activator method within the master bundle enables a developer to specify the order in which individual bundles are initiated and terminated within the master bundle. In addition, a separate thread may be created to activate the individual bundles, thus freeing the OSGi framework activator thread, which generates a class loader and calls the bundle activator for each bundle. In this manner, system performance is improved.

The bundle consolidator tool also analyzes target bundles for name space collisions and, in the event a collision is detected, the tool modifies byte codes within bundles to eliminate the collision.

BRIEF DESCRIPTION OF THE DRAWINGS

A better understanding of the present invention can be obtained when the following detailed description of the disclosed embodiments is considered in conjunction with the following drawings.

DETAILED DESCRIPTION OF THE FIGURES

Figure 1:
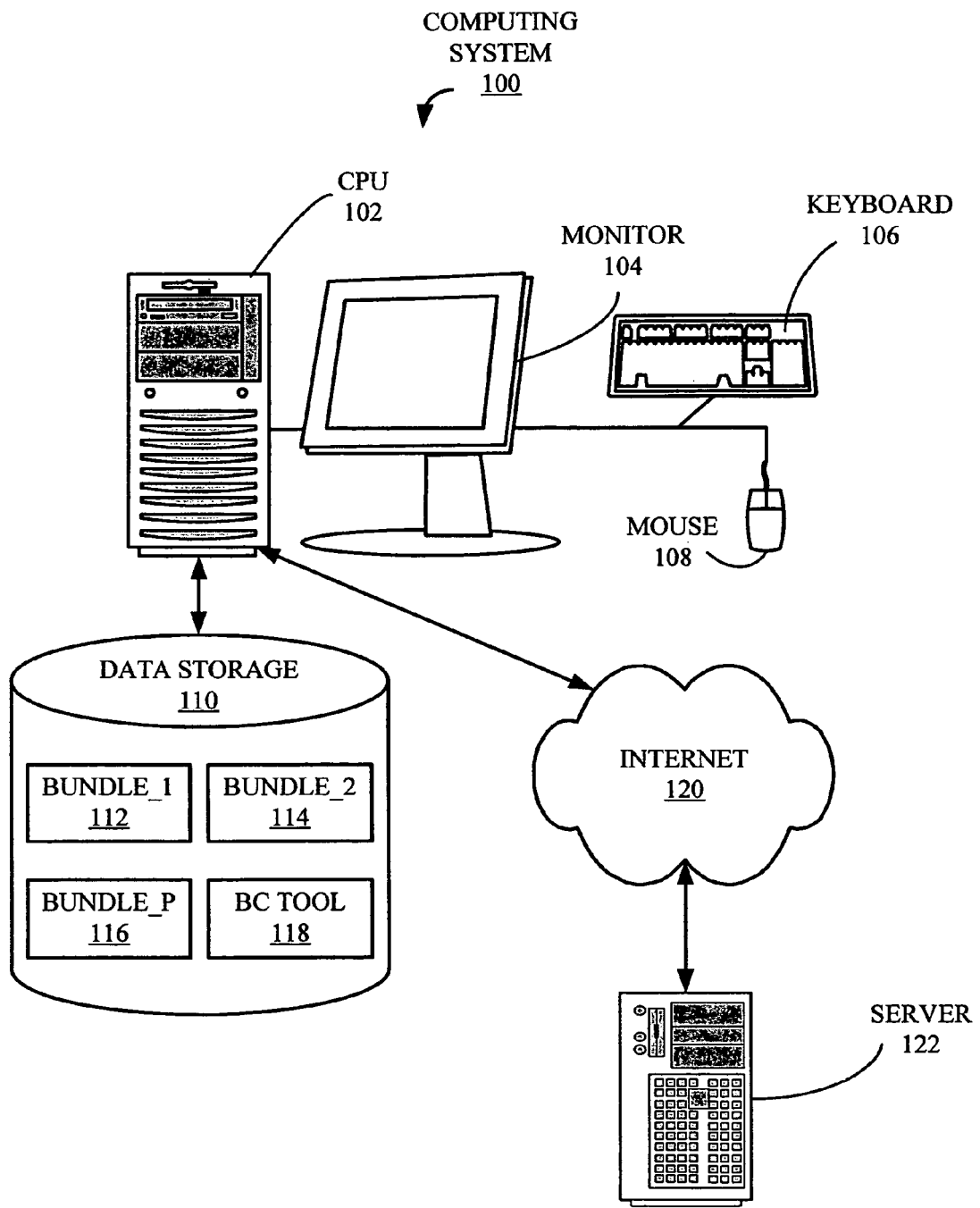
FIG. 1 is a block diagram of an exemplary computing system that employs the claimed subject matter.

Although described with particular reference to an OSGi framework, the claimed subject matter can be implemented in any information technology (IT) system in which an efficient build and load process is desirable. Those with skill in the computing arts will recognize that the disclosed embodiments have relevance to a wide variety of computing environments in addition to those described below. Further, although described with respect to bundles and projects, the claimed subject matter also is applicable to modules, applications or any other type of interdependent computer logic. In other words, the disclosed technology is applicable to any situation in which there is interdependent computer code and a user or developer needs or wants to control the manner and order in which the code is initiated and/or executed.

In addition, the methods of the disclosed invention can be implemented in software, hardware, or a combination of software and hardware. The hardware portion can be implemented using specialized logic; the software portion can be stored in a memory and executed by a suitable instruction execution system such as a microprocessor, personal computer (PC) or mainframe.

In the context of this document, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic, infrared or semiconductor system, apparatus or device. Memory an recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

One embodiment, in accordance with the claimed subject, is directed to a programmed method for OSGi bundle management. The term "programmed method", as used herein, is defined to mean one or more process steps that are presently performed; or, alternatively, one or more process steps that are enabled to be performed at a future point in time. The term programmed method anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Turning now to the figures, FIG. 1 is a block diagram of an exemplary computing system architecture 100 that incorporates the claimed subject matter. A central processing unit (CPU) 102 is coupled to a monitor 104, a keyboard 106 and a mouse 108, which together facilitate human interaction with computing system 100. Attached to CPU 102 is a data storage component 110, which may either be incorporated into CPU 102 i.e. an internal device, or attached externally to CPU 102 by means of various, commonly available connection devices such as but not limited to, a universal serial bus (USB) port (not shown). Data storage 110 is illustrated storing several exemplary OSGi bundles, including a first bundle, or "bundle_1," 112, a second bundle, or "bundle_2," 114 and a bundle package, or "bundle_P," 116. Bundle_1 112 and bundle_2 114 are typical OSGi bundles that are used for illustrative purposes. It should be noted that a typical application or system may include many OSGi bundles, but for the sake of simplicity only two are shown. Bundle_P 116 is an object that represents an application or package and is employed by a BC tool 118, also stored in this example on data storage 110, to generate the corresponding application or package according to the disclosed subject matter. Bundle_P 116 and BC Tool 118 are described in more detail below in conjunction with FIGS. 3-5.

CPU 102 is connected to the Internet 120, which is also connected to a server computer 122. Although in this example, CPU 102 and server 122 are communicatively coupled via the Internet, they could also be coupled through any number of communication mediums such as, but not limited to, a local area network (LAN) (not shown).

Figure 2:
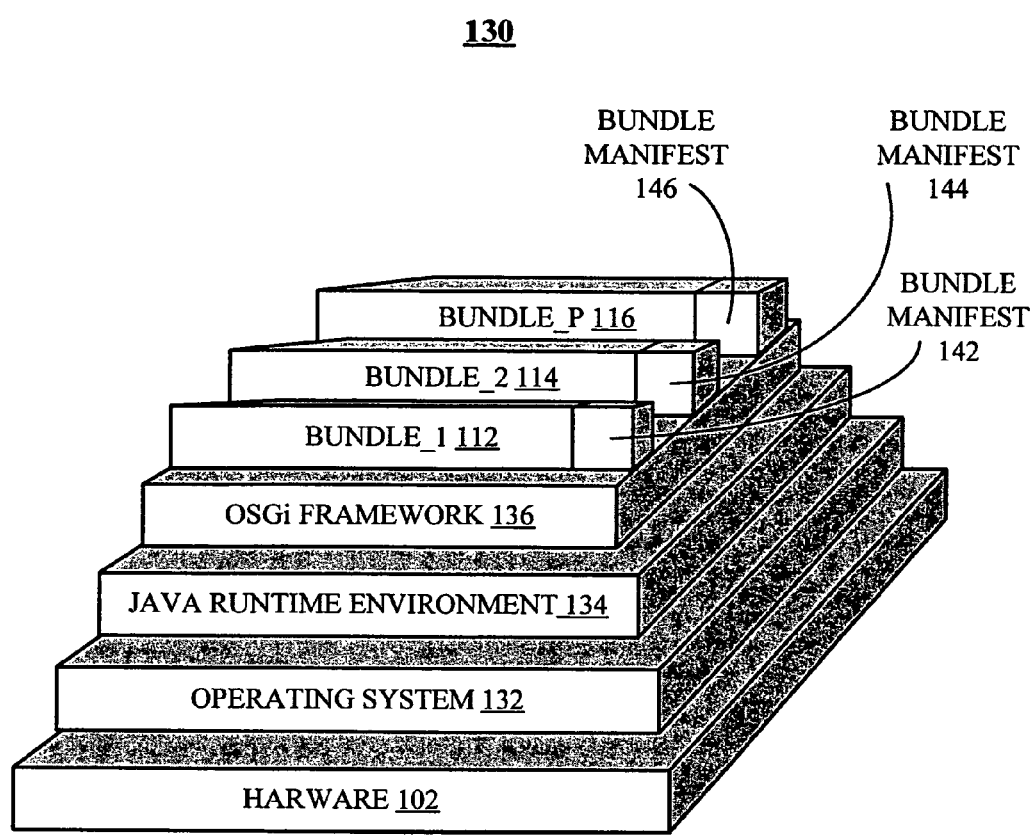
FIG. 2 is a block diagram of an exemplary computer architecture that executes on the computing system of FIG. 1 and supports an OSGi framework incorporating the claimed subject matter.

FIG. 2 illustrates an exemplary computing architecture 130 that supports an OSGi framework 136 and the claimed subject matter. System 130 is implemented on a hardware platform, in this example CPU 102 (FIG. 1). Other possible platforms include, but are not limited to, such computing platforms as server 122 (FIG. 1), television set top boxes, service gateways, cable modems, consumer electronic devices, personal computers (PCs), industrial computers and automobiles. An operating system (OS) 132 manages the resources of hardware 102. Examples of three OSs that support the claimed subject matter include Linux, Macintosh and the various versions of Windows, all of which, as well as others, should be familiar to those with skill in the computing arts. In this example, OS 132 is supporting a Java runtime environment 134. Java runtime environment 134 supports the Java programming language, which is a product of Sun Microsystems, Inc. of Santa Clara, Calif. Java runtime environment 134 includes a Java runtime engine (not shown) which executes Java programs, Java programs are compiled into byte codes which are interpreted by the Java runtime environment 134 rather then being compiled into native machine code. In this manner, a particular Java program can be written to execute on any hardware platform 102 and OS 132 that includes the Java runtime environment 134.

OSGi framework 136 is designed to operate in Java runtime environment 134. Framework 136 provides the core of the OSGi Service Platform Specification. As explained above in the Background, the OSGi Service Platform Specification was first developed in 1999 to simplify the delivery of services over local networks and devices, industrial computers and automobiles. OSGi framework 136 provides an execution environment for, in this example, electronically downloadable services, or bundles 112, 114, 116 (FIG. 1) and BC Tool 118 (FIG. 1). Framework 136 includes program life cycle management, data storage, program version management and a service registry for bundles 112, 114, 116 and 118. In this example, bundles 112 and 114 are parts of a single Java application or service defined by bundle_P 116 and include classes, methods and other resources, which provide functions, or "services," to end-users of computing system 100 (FIG. 1) and other bundles. Typically, but not necessarily, bundles 112, 114, 116 and 118 are stored in a standard Zip-based Java file format, or Java Archive (JAR) file.

Bundle_P 116, implements aspects of the claimed subject matter by providing a processing "shell" for bundle_1 112 and bundle_2 114. In other words, rather than executing bundle_1 112 and bindle_2 114 individually to provide the functionality of the corresponding application or service, a user executes bundle_P 116, which then initiates bundle_1 112 and bundle_2 114 in an order determined by the developer. In addition, bundle_P 116 includes a bundle initiator thread (see FIG. 3) for initiating bundle_1 112 and bundle_2 114. In this manner, bundle_P 116 eliminates the need for OSGi framework 136 to create and execute individual class loaders for bundle_1 112 and bundle_2 114.

OSGi bundles 112 and 114 include Java classes and other resources (not shown) which provide functions to end users of system 100 and provide components, or "services," to other bundles. Bundles typically implement zero or more services. Bundles 112 and 114 may include such things as, but not limited to, class files for the Java programming language as well as other data such as, but not limited to, hypertext markup language (HTML) files, help files and icons. Like other OSGI compliant bundles, bundles 112 and 114 each include a manifest file 142 and 144, respectively, which describes the contents of the corresponding bundle 112 or 114 and provides information that framework 136 requires to correctly install and activate the corresponding bundle 112 and 114. Bundles 112 and 114 also include a special class, or "bundle activator," (not shown) that provides methods to start and stop the bundle 112 and 114.

It should be noted that, although bundles 112 and 114 are typical OSGi bundles, the included bundle activators are not employed when bundles 112 and 114 are initiated in a manner in conformity with the claimed subject matter. Rather, the bundle activators of bundles 112 and 114 are used only if one or both of the bundles are activated individually rather than as part of the application or system of which they are a part. In the alternative, bundles 112 and 114 may not even include bundle activators if their only function is as part of the corresponding application or service. In addition, bundles 112 and 114 include, in manifest files 142 and 144, information about any resource dependencies the corresponding bundle 112 or 114 may have.

Figure 3:
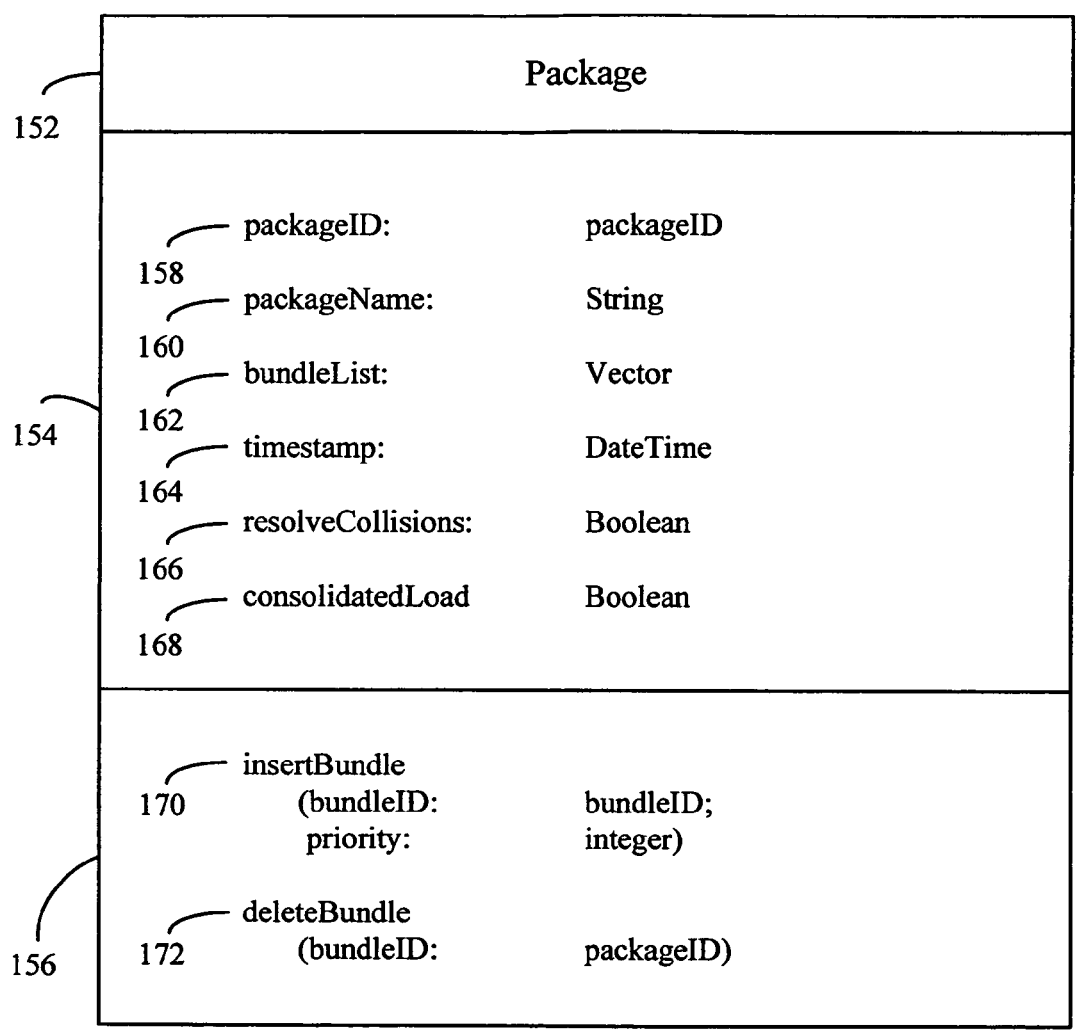
FIG. 3 is a class diagram of an exemplary memory object corresponding to an OSGi bundle employed in conjunction with the claimed subject matter.

FIG. 3 is a class diagram 150 showing some exemplary attributes and methods of a memory object corresponding to bundle_P 116 (FIGS. 1 and 2). It should be noted that an actual implementation of bundle_P 116 may include additional attributes and methods not shown here. Although bundle_P 116 meets all the specifications for OSGi bundles, bundle_P 116 is specifically designed to implement aspects of the claimed subject matter.

Memory object 150 includes a title section 152, which merely states the name of object 150, i.e. "Package," an attribute section 154, which contains memory elements, or attributes, associated with memory object 150, and a method section 156, which includes functions, or methods, that are executed in conjunction with memory object 150.

Attribute section 154 includes a "packageID" attribute 158, a "packageName" attribute 160, a "bundleList" attribute 162, a "timeStamp" attribute 164, a "resolveCollisions" attribute 166 and "ConsolidatedLoad" attribute 168. Instantiations of object 150 are stored in data storage 110 (FIG. 1) of computing system 100 (FIG. 1).

PackageID attribute 158 is a variable of type PackageID that contains a reference to a particular instance of object 150. Each instance of object 150 has a unique value for attribute 158 that allows each instance to be uniquely identified. PackageID attribute 158 is employed to locate information concerning the corresponding object and to execute relevant methods on object 150. PackageName attribute 160 is a variable of type String that stores the name of a particular application or package associated with a particular instantiation of object 150.

BundleList attribute 162 is a variable of type Vector that represents a list of particular bundle IDs that comprise the application or package associated with object 150. For example, in the following description memory object 150 is associated with an application that includes bundle_1 112 (FIGS. 1 and 2) and bundle_2 114 (FIGS. 1 and 2) and, therefore, bundleList 162 includes bundle IDs that uniquely identify bundle_1 112 and bundle_2 114.

The order in which bundles are listed in bundleList 162 determines the order in which the bundles are activated. In other words, when a particular bundle is added to the list, the bundle is inserted into the list in a position corresponding to the order in which the developer intends for the bundle to be activated. In the alternative, bundleList 160 stores a variable (not shown) in conjunction with each bundleID that corresponds to the desired order of activation. BC Tool 118 provides an OrganizeBundle function 196 (see FIG. 4) that provides the tools for a user or administrator to specify the bundle activation order.

Timestamp attribute 164 is a variable of type DateTime that stores a value corresponding to the date and time the application or package corresponding to packageName attribute 160 was last generated, if ever. ResolveCollisions attribute 166 is a variable of type Boolean that indicates whether or not name space collisions detected by BC tool 118 (FIGS. 1 and 2) in the application or package represented by package name 160 and memory object 150 should be automatically resolved, or corrected, when BC tool 118 either checks for conflicts or generates the corresponding application or package (see FIGS. 4 and 5). ConsolidatedLoad attribute 168 is a variable of type Boolean that indicates whether or not BC tool 118 (FIGS. 1 and 2) should employ a single class loader to load all bundles referenced bundleList 162 or to simply call activators associated with each bundle, thereby generating a individual class loader for each bundle. Attributes 166 and 168 are explained in more detail below in conjunction with FIG. 4.

Method section 156 of object 150 includes an "InsertBundle" method 170 and a "DeleteBundle" method 172. Methods 170 and 172 are merely example of two methods that are employed to implement the claimed subject matter. It should be noted that other methods or utility functions (not shown) may also be provided such as, but not limited to, methods to retrieve and set variables such as timestamp 164, resolveCollisions 166 and consolidatedLoad 168, to do memory collection and to activate and deactivate the bundle.

InsertBundle method 170 is called, with two parameters, a bundleID parameter of data type BundleID and a priority parameter of data type Integer. BundleID parameter is employed to uniquely identify a particular bundle that the developer desires to add to the package represented by memory object 150. Method 170 includes a reference to the bundle corresponding to bundleID parameter in bundleList 162. The value stored in the priority parameter is employed by method 170 to determine where in bundleList 162 to insert the reference to the particular bundle. As mentioned above, in one embodiment, the position of a reference to a bundle in bundleList 162 determines the order in which the bundle is activated. In another embodiment, the priority parameter is stored in conjunction with the bundleID in bundleList 162 and BC Tool 118 determines a bundle activation order based upon stored priority values.

DeleteBundle method 172 is employed to remove a reference to a particular bundle form bundleList 162 and thus remove the bundle from the package or application that a particular instantiation of memory object 150 represents. DeleteBundle method 172 is called with one parameter, a bundleID parameter of data type BundleID. BundleId parameter references the particular bundle that a developer desired to remove from the package or application.

Figure 4:
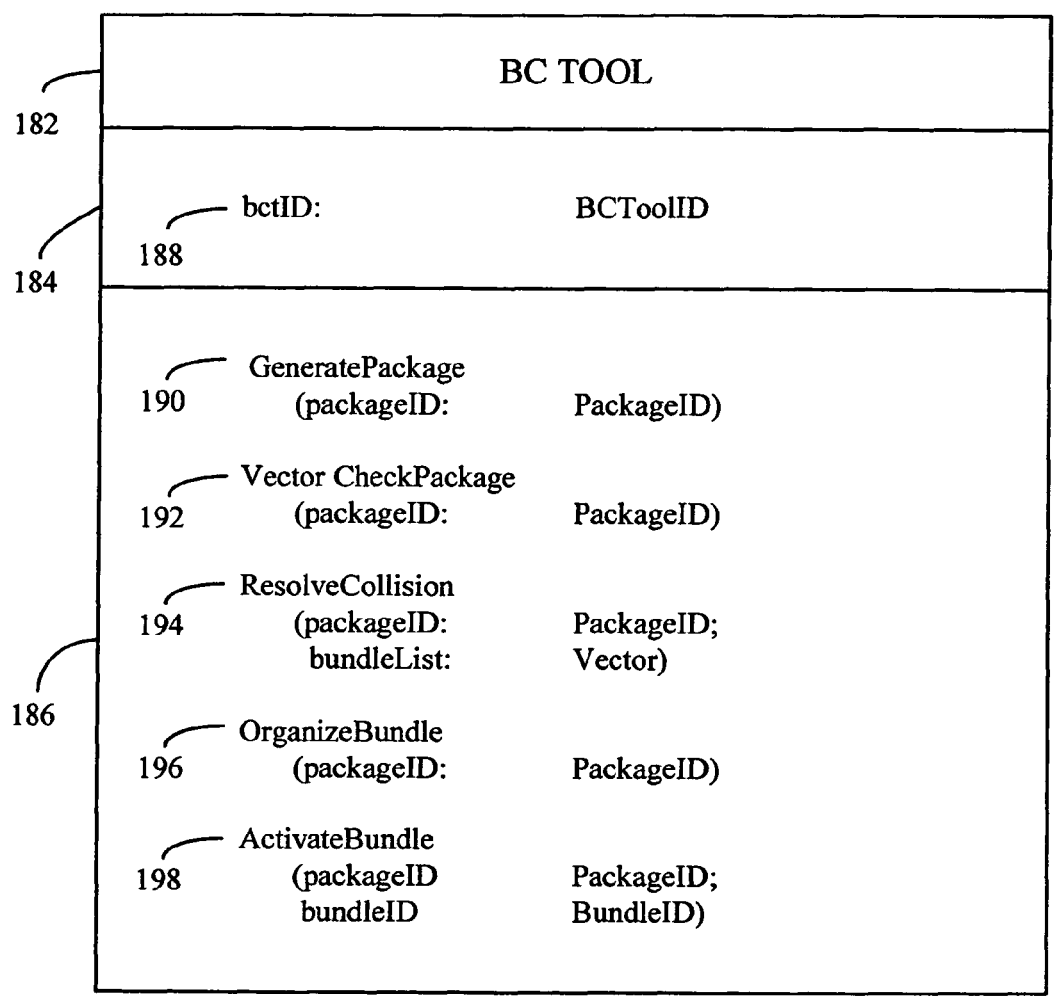
FIG. 4 is a block diagram of an exemplary memory object corresponding to a bundle consolidation (BC) tool employed in conjunction with the claimed subject matter.

FIG. 4 is a block diagram of an exemplary bundle consolidation (BC) tool memory object 180 corresponding to a bundle consolidation (BC) tool 118 (FIGS. 1 and 2) employed in conjunction with the claimed subject matter. Memory object 180 illustrates some exemplary attributes and methods. It should be noted that an actual implementation of memory object 180 and BC Tool 118 may include additional attributes and methods not shown here. Although BC Tool 118 meets all the specifications for OSGi bundles, BC Tool 118 is specifically designed to implement aspects of the claimed subject matter.

Memory object 180 includes a title section 182, which merely states the name of object 180, i.e. "BC Tool," an attribute section 184, which contains memory elements, or attributes, associated with memory object 180, and a method section 186, which includes functions, or methods, that are executed in conjunction with memory object 180.

Attribute section 182 includes a "bctID" attribute 188, which is a variable of type BCToolID that contains a reference to a particular instance of object 180. Each instance of object 180 has a unique value for attribute 188 that allows each instance to be uniquely identified. BctID attribute 188 is employed to locate information concerning the corresponding object and to execute relevant methods on object 180. Instantiations of object 180 are stored in data storage 110 (FIG. 1) of computing system 100 (FIG. 1).

Method section 186 of object 180 includes a "GeneratePackage" method 190, a "CheckPackage" method 192, a "ResolveCollision" method 194, an "OrganizeBundle" method 196 and an "ActivateBundle" method 198. Methods 190, 192, 194, 196 and 198 are merely example of several methods or functions that are employed to implement the claimed subject matter. It should be noted that other methods or utility functions (not shown) may also be provided such as, but not limited to, methods to retrieve and set variables (not shown) and to do memory collection or cleanup.

GeneratePackage method 190 is called with one parameter, a packageID parameter of data type PackageID. PackageID parameter is employed to uniquely identify a particular application or package represented by an instantiation of packet object 150 (FIG. 3) that the developer desires to load into, in this example computing system 100 (FIG. 1).

According to the claimed subject matter, method 190 loads the packages listed in bundleList 162 (FIG. 3) of memory object 150 in the order specified within bundleList 162. In addition, if serializeLoad attribute (FIG. 3) is set to a value of TRUE, method 190 employs a single class loader to load all bundles referenced in bundleList 162, thus reducing the overhead of loading the application or package corresponding to the particular instantiation of memory object 150, which in this example is bundle_P 116 (FIGS. 1 and 2). In one embodiment, method 190 executes CheckPackage method 192, explained in more detail below, prior to loading any packages to ensure that no name space issues occur during loading. GeneratePackage method 190 is explained in more detail below in conjunction with FIG. 5.

CheckPackage method 192 is called with one parameter, a packageID parameter of data type PackageID. PackageID parameter is employed to uniquely identify a particular application or package represented by an instantiation of packet object 150 that the developer desires to check for name space collisions. Method 192 returns a vector that references package IDs 158 that have name space collision issues. In the event that method 192 does not detect a name space collision issue, method 192 returns a NULL value.

ResolveCollision method 194 is called with two parameters, a packageID parameter of data type PackageID and a bundleList parameter of data type Vector. The packageID parameter is employed to uniquely identify a particular application or package represented by an instantiation of packet object 150 in which the developer desires to resolve name space collisions detected during execution of CheckPackage method 192. Method 194 determines whether or not the corresponding package 150 referenced by the packageID parameter has resolveCollisions attribute 166 set to a value of TRUE or FALSE to determine whether or not to proceed with an attempt to resolve a name space collision resolution. In one embodiment, method 194 modifies byte codes of appropriate bundles to remove name space collisions. The Vector parameter is a list of package IDs corresponding to packages detected during execution of CheckPackage method 192 that have name space collision issues that need to be resolved.

OrganizePackage method 196 is called with one parameter, a packageID parameter of data type PackageID. PackageID parameter is employed to uniquely identify a particular application or package represented by an instantiation of packet object 150 in which the developer desires to specify the order of activation of the corresponding bundles. In one embodiment, method 196 generates a graphical user interface (GUI) (not shown) that is displayed on monitor 104 (FIG. 1) and enables the package developer to rearrange the bundles associated with a target package and then stores the result in conjunction with bundleList 162 of the target package.

ActivatePackage method 198 is called with two parameters, a packageID parameter of data type PackageID and a bundleID parameter of data type BundleID. PackageID parameter is employed to uniquely identify a particular application or package represented by an instantiation of packet object 150 in which the developer desires to activate a corresponding bundle. BundleID parameter is employed to uniquely identify a particular bundle associated with the package identified by the packageID parameter which the developer desires to activate. The procedure for activating bundles is explained in more detail below in conjunction with FIG. 5.

Figure 5:
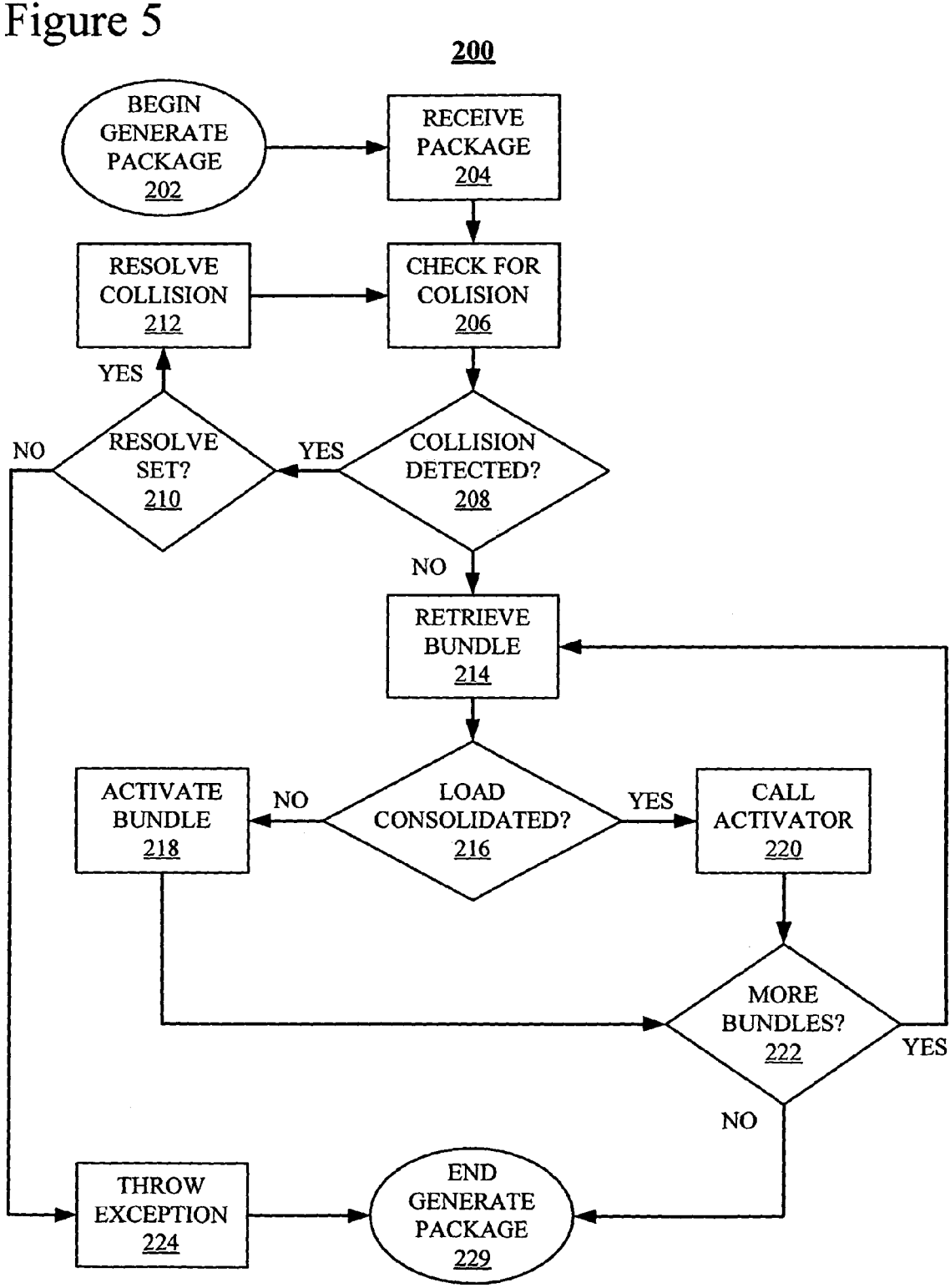
FIG. 5 is a flowchart of a Generate Package function executed in conjunction with the claimed subject matter.

FIG. 5 is a flowchart of a Generate Package method 200 executed in conjunction with the claimed subject matter. Method 200 corresponds to GeneratePackage method 190 (FIG. 4) of BC Tool object 180 (FIG. 4). Method 200 starts in a "Begin Generate Package" block 202 and proceeds immediately to a "Receive Package" block 204. During block 204, process 200 is initiated by a call to GeneratePackage method 190 of BC Tool 118 and the package received corresponds to the packageID parameter passed to method 190 when method 190 is called. As explained above in conjunction with FIG. 4, the received package is an instantiation of memory object 150 (FIG. 3) that represents an application or package that the user is loading into, in this example, computing system 100 (FIG. 1).

During a "Check for Collision" block 206, process 200 makes a call to CheckPackage method 192, including a reference to the packageID corresponding to the package received during block 204 to determine if there are any name space collision issues with respect to the received package. During a "Collision Detected?" block 208, process 200 determines whether or not a name space collision was detected during block 206 and, if so, proceeds to a "Resolve Set?" block 210. During block 210, process 200 determines whether or not resolveCollisions attribute 166 (FIG. 3) of the package received during block 204 is set to a values of TRUE. If attribute 166 is set to TRUE, process 200 proceeds to a "Resolve Collision" block 212 during which process 200 calls ResolveCollision method 194 of BC Tool 118 with the appropriate information stored in the two parameters. Process 200 then returns to block 206 during which processing continues as described above.

If during block 210 process 200 determines that resolveCollisions attribute 166 of the package received during block 204 is not set to a value of TRUE, then control proceeds to a "Throw Exception" block 224 during which process 200 takes appropriate action to notify the user or administrator who initiated process 200 that an unresolved name space collision has occurred. Although not illustrated, process 200 may proceed to block 224 is at any point during blocks 206, 208, 210 or 212 if process 200 determines that a detected collision is unresolvable.

If during block 208 process 200 determines that there are no unresolved name space collisions, control proceeds to a "Retrieve Bundle" block 214. During block 214, process 200 retrieves from memory a package listed in bundleList 162 (FIG. 3) of the package received during block 204. The particular package retrieved depends upon the order selected for loading. As explained above in conjunction with FIG. 3, there are several ways in which the preferred loading order may be specified. One example is to retrieve the bundles in the order they are listed in bundleList 162, assuming that the bundles were stored with that particular method in mind. Another example is to retrieve the bundles based upon priority codes stored in conjunction with the bundleIDs.

During a "Load Consolidated?" block 216, process 200 determines whether or not the consolidatedLoad attribute 168 (FIG. 3) of the package receive during block 204 is set to a values of TRUE. If attribute 168 is not set to TRUE, process 200 proceeds to an "Activate Bundle" block 218 during which process 200 calls the activator associated with the bundle retrieved during block 214. In other words, in the typical fashion, the activation of the bundle causes a class loader to be spawned specifically for the bundle, which is the typical technique for loading classes, i.e. a class loader is generated for every bundle. If during block 216 process 200 determines that attribute 168 is set to a value of TRUE, process 200 proceeds to a "Call Activation" block 220 during which a single class loader, associated with BD Tool 118, is employed to load the bundle as well as any subsequent bundles that are also designated for a consolidated load. In other words, a single class loader thread is employed to activate the individual bundles, thus freeing the OSGi framework activator thread, which typically generates a class loader for each bundle. In this manner, system performance is improved. The difference between Activate Bundle 218 and Call Activation 220 is that with respect to block 220 much of the overhead associated with the multiple threads of block 218 is eliminated. The functionality of blocks 216, 218 and 220 is incorporated within ActivateBundle method 198 (FIG. 4) of memory object 180 (FIG. 4).

It should be noted that the described subject matter enables the choice of a typical, bundle-by-bundle load or a consolidated loading process to be specified with respect to each bundle. In other words, an attribute (not shown) either of a particular bundle or an attribute (not shown) stored in conjunction with a BundleId within bundleList 162 can specify whether or not the corresponding bundle uses the bundle's own activator or the consolidated loader of BC Tool 118.

Once the bundle has been activated, or loaded, either during block 218 or block 220, process 200 proceeds to a "More Bundles?" block during which process 200 determines whether or not there are any bundles listed in bundleList 162 that remain to be loaded. If so, process 200 returns to block 214 retrieves the next bundle and processing continues as described above.

Finally, if process 200 determines during block 222 that all bundles in bundleList 162 have been loaded or if control has completed with respect to Throw Exception block 224, process 200 proceeds to an "End Generate Package" block 229 in which process 200 is complete.

While the invention has been shown and described with reference to particular embodiments thereof, it will be understood by those skilled in the art that the foregoing and other changes in form and detail may be made therein without departing from the spirit and scope of the invention, including but not limited to additional, less or modified elements and/or additional, less or modified blocks performed in the same or a different order.

We claim:

1. A method for managing bundles associated with a computing framework executed on computing device, comprising:
    defining a plurality of bundles corresponding to a computing package;
    defining a shell bundle corresponding to the plurality of bundles;
    creating a class loader associated with the shell bundle, the class loader comprising a plurality of bundle loaders, each bundle loader corresponding to a corresponding bundle of the plurality of bundles; and
    specifying a loading preference with respect to each particular bundle of the plurality of bundles, wherein a preference corresponding to a particular bundle is either to load the particular bundle with the the corresponding bundle loader or with an activator associated with the particular bundle.

2. The method of claim 1, further comprising:
    creating an activation order associated with the shell bundle, wherein the activation order corresponds to a desired sequential order for activating the plurality of bundles;
    activating each bundle of the plurality of bundles in an order corresponding to the activation order.

3. The method of claim 2, further comprising providing a graphical user interface (GUI) for defining the activation order.

4. The method of claim 1, further comprising loading each particular bundle of the plurality of bundles in accordance with each corresponding loading preference.

5. The method of claim 1, further comprising:
    analyzing the plurality of bundles for name space collisions; and
    modifying the plurality of bundles to resolve a detected name space collisions.

6. The method of claim 5, wherein the modification of the plurality of bundles is performed by modifying byte codes associated with the plurality of bundles.

7. A system for managing bundles associated with a computing framework, comprising:
    a processor;
    a memory, coupled to the processor;
    a plurality of bundles corresponding to a computing package;
    a shell bundle corresponding to the plurality of bundles, wherein the shell bundle is an additional bundle corresponding to the computing package;
    a class loader associated with the shell bundle, the class loader comprising a plurality of bundle loaders, each bundle loader corresponding to a corresponding bundle of the plurality of bundles;
    a loading preference corresponding to a particular bundle of the plurality of bundles, wherein a preference corresponding to the particular bundle is either to load the particular bundle with the the corresponding bundle loader or with an activator associated with the particular bundle; and
    logic for loading the particular bundle of the plurality of bundles in accordance with the corresponding loading preference.

8. The system of claim 7, further comprising:
    an activation order associated with the shell bundle, wherein the activation order corresponds to a desired sequential order for activating the plurality of bundles; and
    logic, stored on the memory and executed on the processor, for activating each bundle of the plurality of bundles in an order corresponding to the activation order.

9. The system of claim 7, further comprising logic for activating a particular bundle of the plurality of bundles with the class loader associated with the shell bundle rather than with an activator associated with the particular bundle.

10. The system of claim 7, further comprising a graphical user interface (GUI) for defining the activation order.

11. The system of claim 7, the logic further comprising logic for:
   analyzing the plurality of bundles for name space collisions; and
   modifying the plurality of bundles to resolve a detected name space collisions.

12. The system of claim 11, wherein the modification of the plurality of bundles is performed by modifying byte codes associated with the plurality of bundles.

13. The system of claim 7, wherein the computing framework is an OSGi framework.

14. A computer programming product for managing bundles associated with a computing framework, comprising:
   a memory;
   a plurality of bundles corresponding to a comuputing package;
   a shell bundle corresponding to the plurality of bundles wherein the shell bundle is an additional bundle corresponding to the computing package; and
   a class loader associated with the shell bundle, the class loader comprising a plurality of bundle loaders, each bundle loader corresponding to a corresponding bundle of the plurality of bundles;
   logic, stored on the memory for execution on a processor, for:
      specifying a loading preference corresponding to a particular bundle of the plurality of bundles, wherein a preference corresponding to the particular bundle is either to load the particular bundle with the the corresponding bundle loader or with an activator associated with the particular bundle; and
      loading the particular bundle of the plurality of bundles in accordance with the corresponding loading preference.

15. The computer programming product of claim 14, the logic further comprising logic for:
   specifying an activation order associated with the shell bundle, wherein the activation order corresponds to a desired sequential order for activating the plurality of bundles; and
   activating each bundle of the plurality of bundles in an order corresponding to the activation order.

16. The computer programming product of claim 15, further comprising a graphical user interface (GUI), stored on the memory and executed on the processor, for defining the activation order.

17. The computer programming product of claim 14, the logic further comprising logic for:
   analyzing the plurality of bundles for name space collisions; and
   modifying the plurality of bundles to resolve a detected name space collisions.

18. The computer programming product of claim 17, wherein the modification of the plurality of bundles is performed by modifying byte codes associated with the plurality of bundles.

* * * * *